United States Patent [19]
Itoh

[11] 3,856,034
[45] Dec. 24, 1974

[54] FLOW CONTROL VALVE

[75] Inventor: Takane Itoh, Yokohama, Japan

[73] Assignee: Nissan Motor Company Limited, Yokohama, Japan

[22] Filed: June 20, 1973

[21] Appl. No.: 371,664

[30] Foreign Application Priority Data
June 21, 1972 Japan.................. 47-62113

[52] U.S. Cl............................ 137/117, 137/487.5
[51] Int. Cl.... F15b 11/02, G05b 11/38, G05d 7/06
[58] Field of Search .......... 137/487.5, 487, 503, 85, 137/86, 115, 117; 318/615, 616, 610, 609; 235/151, 151.34; 340/222

[56] References Cited
UNITED STATES PATENTS

| | | |
|---|---|---|
| 2,917,066 | 12/1959 | Bergson ................. 137/487.5 X |
| 2,948,295 | 8/1960 | Smith, Jr. ................. 137/487.5 |
| 3,552,428 | 1/1971 | Pemberton ............. 137/487.5 X |
| 3,699,989 | 10/1972 | O'Connor ................ 137/487.5 |

Primary Examiner—Alan Cohan
Assistant Examiner—Robert J. Miller
Attorney, Agent, or Firm—Balogh, Osann, Karmer, Dovorak, Genova & Traub

[57] ABSTRACT

A flow control valve for a control system such as a gas turbine engine system controls fluid flow by adjusting a valve opening in accordance with an error signal and controls a pressure difference between the upstream and downstream sides of the valve in accordance with a command signal.

4 Claims, 4 Drawing Figures

FLOW CONTROL VALVE

This invention relates to a flow control valve and, more particularly, to an improved flow control valve, provided in an automatic control system, e.g., in a gas turbine engine system, for accurately and rapidly controlling fluid flow therethrough in response to a command signal.

A flow control valve may be provided in various systems including fluid-operated equipment. For instance, it may be provided in a gas turbine engine system to control fuel flow. For the sake of clarity, the features of a known gas turbine engine system will be hereinafter described. A gas turbine engine control system, which is usually a closed-loop or a feedback control system, includes an error signal generator, a controller, a flow control valve, a gas turbine engine, a detecting device and a feedback circuit. In such a system, as is well known, a command signal representing the desired value of a variable to be controlled (hereinafter referred to as a controllable variable), e.g., engine speed or turbine inlet temperature, is supplied to the comparator. The detecting device detects the actual value of the controllable variable and supplies it to the error signal generator, e.g., a differential amplifier or a summing amplifier, in the form of a signal through the feedback circuit. The comparator compares the command signal with the actual value signal of the controllable variable to produce an error signal and supplies it to the controller. The controller adjusts and amplified this error signal to provide an amplified error signal, which is supplied to the flow control valve. In response to the amplified error signal, the flow control valve controls fuel flow thereby forcing the controllable variable, e.g., engine speed or turbine inlet temperature, to approach a desired value.

Conventionally, a pressure compensated flow control valve has been used in the above-mentioned system. The flow control valve of this type is constructed such, that the pressure difference between the upstream and downstream sides of the valve is maintained at all times substantially constant and that the flow rate of fluid is controlled only by changing the effective area of a fluid flow path, that is, a valve opening in accordance with the above-mentioned amplified error signal. With the afore-mentioned construction, the flow control valve is maintained substantially constant in gain and, therefore, the difference between the command and the actual value of the controllable variable, that is, the error, is proportional to the command signal and is inversely proportional to the open-loop gain of the system. As a result, as the value of the command signal increases the value of the error increases, that is, the control accuracy of the system deteriorates. Therefore, in order to improve the control accuracy of the system, that is, to reduce the error, it may be effected by increasing the open-loop gain of the system. However, the system has its limit in increasing the open-loop gain because of a possible instability which may develop in the system due to the phase lag included in the transfer function of each system component. Accordingly, a control system having a conventional flow control valve has the disadvantage that it cannot obtain satisfactory response characteristics and control accuracy when the value of the command signal is large.

Therefore, it is an object of the present invention to provide an improved flow control valve which can obtain satisfactory response characteristics and control accuracy of the control system to which it belongs, even when the value of a command signal is large.

A further object of the present invention is to provide a flow control valve adapted to increase the pressure difference between the upstream and downstream sides of the valve according to an increased value of a command signal thereby effecting a change directly in the fluid flow rate.

According to the present invention, there is provided an improved flow control valve for a control system of fluid operated equipment. The control system has an error signal generator for providing an error signal by comparing a command signal with an actual value signal of a controllable variable, a controller for adjusting and amplifying said error signal to provide an amplified error signal, the flow control valve controls fluid flow therethrough in accordance with said amplified error signal, fluid-operated equipment e.g., a gas turbine operated by a controlled fluid flow supplied from the flow control valve, a detecting device for detecting the actual value of the controlled quantity and transmitting the actual value signal back to the error signal generator. The flow control valve comprises means for controlling fluid flow by adjusting a valve opening in response to the amplified error signal and means for controlling a pressure difference between the upstream and downstream sides of the flow control valve in accordance with the command signal.

Furthermore, the flow control valve comprises an inlet conduit for receiving pressurized fluid therein, an outlet conduit connected to the inlet conduit for supplying fluid at a controlled rate to the fluid-operated equipment, a valve device disposed between the inlet conduit and outlet conduit, a valve actuating device operatively connected to the valve device and adapted to receive the amplified error signal to adjust the valve opening in accordance with the amplified error signal, a cylinder communicating at one end thereof with the inlet conduit and at the other end thereof with the outlet conduit, a drain opening provided in a wall of the cylinder, a return or drain conduit connected to the drain opening, a spool slidably inserted in the cylinder to adjust the effective area of the drain opening, a spring disposed in the cylinder for urging the spool in one direction, a spool actuating device operatively connected to the spool to receive the command signal to apply force on the spool in accordance with the command signal, whereby the spool controls the effective area of the drain opening at a position where a force caused by the pressure difference, a force of the spring and a force caused by the command signal are balanced.

Other features and advantages of the present invention will be apparent from the following description taken in connection with the accompanying drawings in which.

Figure 1:
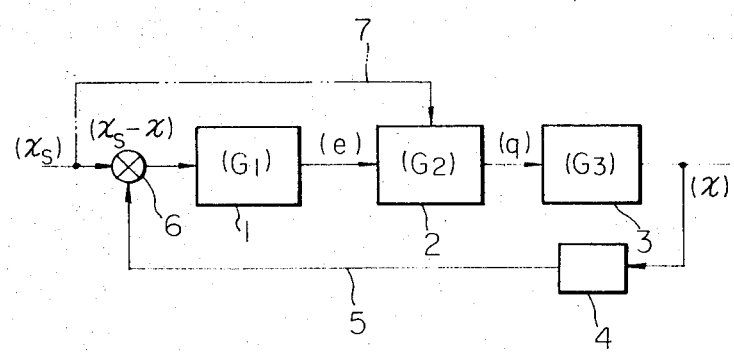
FIG. 1 is a diagram of a gas turbine engine fuel control system, in which a two-dot chain line shows a signal flow added according to the present invention.

Before describing the concept of the present invention more specifically, it will be helpful to describe the construction, operation and disadvantages of a conventional flow control valve which controls fuel flow in a gas turbine engine system, by reference to accompanying drawings. In FIG. 1, a controller 1 receives an error signal, and adjusts and amplifies it to produce an amplified error signal $e$ at its output. A flow control valve 2 disposed subsequent to the controller 1 receives the amplified error signal $e$ from the controller 1, and controls a fuel flow rate $q$ in accordance with the amplified error signal $e$ thereby forcing a controllable variable $x$, e.g., engine speed or turbine inlet temperature, to its desired value. A gas turbine engine 3 disposed subsequent to the flow control valve 2 receives the controlled fuel flow from the flow control valve 2 and is operated thereby. A detecting device 4 detects the actual value of the controllable variable $x$, and transmits it through a feedback circuit 5 back to an error signal generator 6, e.g., a differential amplifier or a summing amplifier. The error signal generator 6 compares the value of a command signal $x_s$ with the actual value of the controllable variable $x$, and provides an error signal $x_s - x$ which is supplied to the controller 1.

Let the transfer functions of the controller 1, flow control valve 2, and gas turbine engine 3 be $G_1$, $G_2$, and $G_3$, respectively. Then, the following equations are obtained:

$$e = G_1(x_s - x) \tag{1}$$

$$q = G_2 \cdot e = G_1 \cdot G_2 (x_s - x) \tag{2}$$

$$x = G_3 \cdot q = G_1 \cdot G_2 \cdot G_3 (x_s - x) \tag{3}$$

From the above-mentioned equations, we obtain:

$$x = G_1 \cdot G_2 \cdot G_3 / 1 + G_1 \cdot G_2 \cdot G_3 \; x_s \tag{4}$$

$$x_s - x = (1 - G_1 \cdot G_2 \cdot G_3 / 1 + G_1 \cdot G_2 \cdot G_3) x_s = 1/1 + G_1 \cdot G_2 \cdot G_3 \; x_s \tag{5}$$

Under the final steady-state condition, the gains $K_1$, $K_2$, and $K_3$ of the afore-mentioned transfer functions $G_1$, $G_2$, and $G_3$ can be expressed as follows:

$$K_1 = |G_1|$$
$$K_2 = |G_2|$$
$$K_3 = |G_3|$$

Therefore, the above-mentioned equation (5) can be re-expressed as follows:

$$x_s - x = 1/1 + K_1 \cdot K_2 \cdot K_3 \; x_s \tag{6}$$

However, the product of $K_1$, $K_2$, and $K_3$ is usually 97 or 98 and, therefore:

$$K_1 \cdot K_2 \cdot K_3 \gg 1$$

With this relation in view, the equation (6) can be given as follows:

$$x_s - x = 1/K_1 \cdot K_2 \cdot K_3 \; x_s \tag{7}$$

Therefore, the afore-mentioned equations (1) and (2) can be re-expressed as follows, respectively:

$$e = K_1(x_s - x) \approx 1/K_2 \cdot K_3 \; x_s \tag{8}$$

$$q = K_2 \cdot e = K_2 \cdot K_1(x_s - x) \approx 1/K_3 \; x_s \tag{9}$$

Conventionally, a pressure compensated flow control valve has been used as the flow control valve 2. The flow control valve of this type is adapted not to be influenced by changes in pump characteristics, load pressure applied to the valve, etc. As is well known, a flow rate $q$ controlled by a valve is expressed as follows:

$$q = k \cdot A \sqrt{\Delta p} \tag{10}$$

where $k$ = a proportional constant, $A$ = the effective area of the flow path of the valve, and $\Delta p$ = the pressure difference between the upstream and downstream sides of the valve. The pressure compensated flow control valve is constructed such that the pressure difference $\Delta p$ between the upstream and downstream sides of the valve is maintained at all times substantially constant and that the flow rate $q$ is adjusted only by changing the effective area $A$ of the flow path in accordance with the afore-mentioned amplified error signal $e$. With the above-mentioned construction, the gain $K_2$ of the pressure compensated flow control valve is maintained substantially constant. Therefore, in a control system which includes such a pressure compensated flow control valve, the value of the error $x_s - x$ is proportional to the value of the command signal $x_s$, and is inversely proportional to the open-loop gain of the system, as is apparent from the equation (7).

Figure 2:
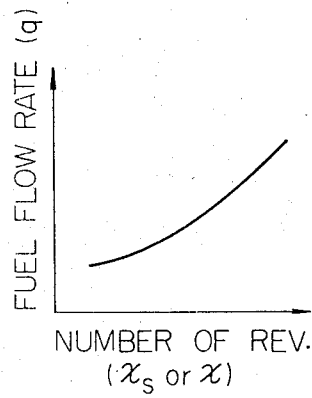
FIG. 2 is a characteristic curve diagram showing the relation between the number of revolutions of a gas turbine gas-producer and its fuel flow rate.
Figure 3:
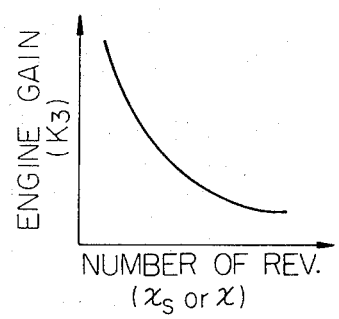
FIG. 3 is a characteristic curve diagram showing the relation between the number of revolutions of a gas turbine gas producer and engine gain.

In cases where the illustrated control system is used to control the number of revolutions of a gas turbine engine gas-producer, experimental results shown in FIGS. 2 and 3 are obtained. In this case, $x_s$ is the command signal for the desired number of revolutions, and $x$ is the actual value of the same. FIG. 2 shows the experimental relation between fuel flow $q$ and the number of revolutions $x_s$ or $x$, and FIG. 3 shows the experimental relation between engine gain $K_3$ and the number of revolutions $x_s$ or $x$. As is shown in FIGS. 2 and 3, as the number of revolutions $x_s$ or $x$ increases, fuel flow rate $q$ increases and engine gain $K_3$ decreases. Therefore, control accuracy of the number of revolutions is deteriorated as the value of the command signal $x_s$ increases because of a combined effect of the increased value of the command signal $x_s$ and the decreased value of the gain $K_3$, as is apparent from the equation (7). In cases where the afore-mentioned control system is used to control the turbine inlet temperature, the same tendency as mentioned above is observed. In this case, such a tendency is very undesirable because the error in temperature at high temperatures has adverse influence on the life and characteristics of a turbine.

In order to improve control accuracy, that is, to decrease the error $x_s-x$, it may be necessary to increase the open-loop gain of the system, as is apparent from the equation (7). However, the system has its limit in increasing the open-loop gain because of a possible instability which may develop in the system due to the phase lag included in the transfer functions $G_1$, $G_2$, $G_3$, etc.

In consideration of the above-mentioned construction, operation and disadvantages of the conventional flow control valve and control system, the present invention contemplates to add the command signal $x_s$ directly to the flow control valve through a two-dot chain line 7 shown in FIG. 1. In this way, the pressure difference $\Delta p$ between the upstream and downstream sides of the valve is increased as the value of the command signal $x_s$ increases thereby directly reflecting a change in the value of the command signal $x_s$ on the flow rate $q$, as will be hereinafter described in detail.

Figure 4:
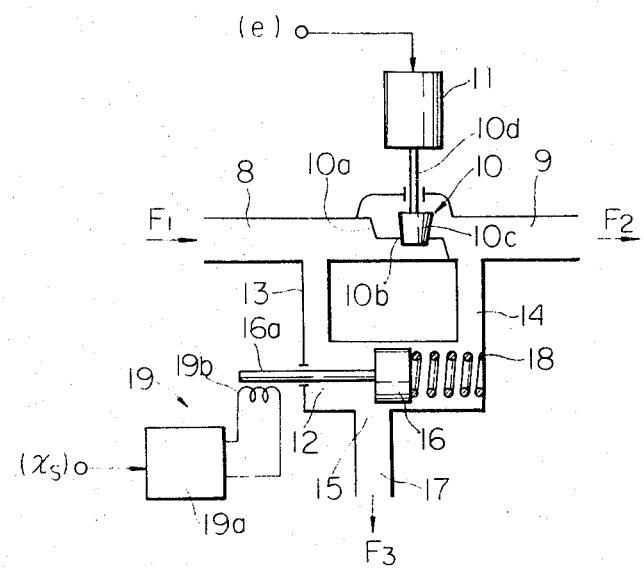
FIG. 4 is a schematic principle diagram of a flow control valve according to the present invention.

FIG. 4 shows one embodiment of a flow control valve according to the present invention. An inlet conduit 8 is provided for receiving pressurized fluid from a pump (not shown). The pressurized fluid flows in the direction of an arrow $F_1$. An outlet conduit 9 connected to the inlet conduit 8 is provided for discharging controlled fluid at a flow rate of $q$ in the direction of an arrow $F_2$ to fluid-operated equipment such as a gas turbine engine (not shown). A valve device generally designated by 10 is disposed between the inlet conduit 8 and outlet conduit 9. The valve device 10 is operatively connected to a valve actuating device 11 disposed outside the conduits 8 and 9. The valve actuating device 11 receives the output signal of the controller 1 shown in FIG. 1, i.e., an amplified error signal $e$ to actuate the valve device 10 in accordance with the signal $e$ to adjust the valve opening. In FIG. 4, the valve device 10 is shown to consist of a wall 10a with an opening 10b disposed between the inlet conduit 8 and outlet conduit 9, a valve head 10c of a truncated cone shape slidable in the opening 10b, a valve stem 10d connected at one end thereof to the valve head 10c and operatively connected at the other end thereof to the valve actuating device 11 through the wall of the outlet conduit 9. Of course, other types of valve devices may be used. A cylinder 12 is connected at one end thereof to the inlet conduit 8 through a communication conduit 13 and at the other end thereof to the outlet passage 9 through a communication conduit 14. A drain opening 15 is provided in a wall of the cylinder 12. A spool 16 with a stem 16a is slidably inserted in the cylinder 12 to adjust the effective area of the drain opening 15. A return or drain conduit 17 is connected at one end thereof to the drain opening 15 and at the other end thereof to a reservoir tank (not shown). A spring 18 is disposed in the cylinder 12 to urge the spool 16 at all times in one direction, that is, to the left in the figure to close the drain opening 15. The spool stem 16a is slidably projected through an end wall of the cylinder 12. A spool actuating device generally designated by 19 receives a command signal $x_s$ and is operatively connected to the spool 16 through the stem 16a. The spool actuating device preferably consists of a torque motor 19a (or a dynameter) having a coil 19b. The torque motor 19a is made such that a magnetic force generated in the coil 19b is changed by a signal current of the command signal $x_s$ flowing therethrough for forcing the spool stem 16a to move, and that increase in the value of the command signal $x_s$ results in an increase in the leftward (in the figure) magnetic force, which has the same effect as an increase in the force of the spring 18.

In operation, the valve actuating device 10 receives an amplified error signal $e$ from the controller 1 shown in FIG. 1 and moves the valve head 10c in accordance with the amplified error signal $e$ to set the effective area A of the opening 10b, that is, to set the degree of valve opening. Pressurized fluid supplied from a pump (not shown) to the inlet conduit 8 flows through the opening 10b having an effective area set by the valve head in accordance with the amplified error signal $e$, and flows into the outlet conduit 9. From the outlet conduit 9, fluid flows at a controlled rate of $q$ to fluid-operated equipment such as a gas turbine engine. When pressure in the inlet conduit 8 increases relative to that in the outlet conduit 9, force rightwardly (in the figure) exerted on the spool 16 increases to move the spool 16 to the right (in the figure) against the force of the spring 18. The spool actuating device 19 receives a command signal $x_s$ and also applies force on the spool 16. Thus the spool stops at a position where the above-mentioned three forces are balanced. Since the effective area of the drain opening 15 increases in this way, excess fluid is discharged from the inlet conduit 8 through the return or drain conduit 17 to a reservoir tank (not shown) in the direction of an arrow $F_3$ thereby reducing pressure in the inlet passage 8. When pressure in the inlet passage 8 decreases relative to that in the outlet conduit 9, the spool 16 is forced to move in the leftward direction (in the figure) and decreases the effective area of the drain opening 15. Thus the flow rate of fluid discharged through the return or drain conduit 17 from the inlet conduit 8 decreases and, therefore, pressure in the inlet conduit 8 increases. In this way, pressure difference between the upstream and downstream sides of the valve is automatically controlled by the movement of the spool 16 to obtain a value which is determined by a balance of the force caused by said pressure difference, the force of the spring, and the forces applied on the valve stem 16a in accordance with the command signal $x_s$. Accordingly, the effective area A of the opening 10b is controlled by the amplified error signal $e$, and the pressure difference $\Delta p$ between the upstream and downstream sides of the valve is controlled by the command signal $x_s$.

Therefore, in a flow control valve according to the present invention, the effective area A of the fluid flow path, that is, the valve opening, and the pressure difference $\Delta p$ between the upstream and downstream sides of the valve can be selected as any functions of $e$ and $x_s$, respectively. For instance, let them be:

$$A \propto e_2$$
$$\Delta p \propto x_s$$

Then, the equation (10) will be:

$$q = k' \cdot e \cdot \sqrt{x_s^2} = k' \cdot x_s \cdot e \tag{11}$$

where $k'$ is a proportional constant. From the equations (9) and (11), we obtain:

$$k_2 \cdot e = k' \cdot x_s \cdot e$$
$$K_2 = k' \cdot x_s \tag{12}$$

From the equations (7) and (12), we obtain:

$$x_s - x = 1/K_1 k' x_s k_3 \, x_s = 1/K_1 k' \cdot K_3 \quad (13)$$

Thus, according to the present invention, the error $x_s - x$ becomes independent of the value of the command signal $x_s$ and, in addition, the gain in the flow rate $q$ in regard to the input signal $e$ to the flow control valve increases as the value of the command signal $x_s$ increases. In this way, the reliability and response characteristics of the control system are improved since any change in the value of the command signal $x_s$ can be rapidly applied to the flow rate $q$ and, in addition, the value of the error $x_s - x$ can be reduced to a minimum independently of the value of the command signal $x_s$.

What is claimed is:

1. In a control system for fluid operated equipment having an error signal generator for providing an error signal by comparing a command signal representing a desirable value signal with an actual value signal of a controllable variable, and having a controller for adjusting and amplifying said error signal to provide an amplified error signal; a flow control valve for controlling fluid flow therethrough in accordance with said amplified error signal, said fluid-operated equipment being operated by fluid discharged from said flow control valve at a controlled flow rate, a detecting device for detecting the actual value of said controllable variable and transmitting said actual value signal back to said comparator, said flow control valve comprising means for controlling fluid flow by adjusting a valve opening in accordance with said amplified error signal and means for controlling a pressure difference between the upstream and downstream sides of said flow control valve in accordance with said command signal, said means for controlling fluid flow including an inlet conduit for receiving pressurized fluid flow therein and an outlet conduit connnected to said inlet conduit for discharging fluid at a controlled flow rate to said fluid-operated equipment, and said means for controlling the pressure difference between the upstream and downstream sides of said flow control valve in response to said command signal including a cylinder communicating at one end thereof with said inlet conduit and at the other end thereof with said outlet conduit, and having a drain opening provided in a wall of said cylinder, a return conduit connected to said drain opening, a spool slidably inserted in said cylinder to adjust the effective area of said drain opening, a spring disposed in said cylinder for urging said spool in one direction, and a spool actuating device operatively connected to said spool and adapted to receive said command signal to apply force on said spool in accordance with said command signal, whereby said spool controls the effective area of said drain opening at a position where a force caused by said pressure difference, a force of said spring and a force caused by said command signal are balanced.

2. A flow control valve as claimed in claim 1, wherein said means for controlling fluid flow further includes a valve device disposed between said inlet conduit and outlet conduit, and a valve actuating device operatively connected to said valve device and adapted to receive said amplified error signal to adjust said valve opening in accordance with said amplified error signal.

3. In a control system for fluid operated equipment having an error signal generator for providing an error signal by comparing a command signal representing a desirable value signal with an actual value signal of a controllable variable, and having a controller for adjusting and amplifying said error signal to provide an amplified error signal; a flow control valve for controlling fluid flow therethrough in accordance with said amplified error signal, said fluid-operated equipment being operated by fluid discharged from said flow control valve at a controlled flow rate, a detecting device for detecting the actual value of said controllable variable and transmitting said actual signal back to said comparator, said flow control valve comprising means for controlling fluid flow by adjusting a valve opening in accordance with said amplified error signal and means for controlling a pressure difference between the upstream and downstream sides of said flow control valve in accordance with said command signal, and further comprising an inlet conduit for receiving pressurized fluid flow therein, an outlet conduit connected to said inlet conduit for discharging fluid at a controlled flow rate to said fluid-operated equipment, a valve device disposed between said inlet conduit and outlet conduit, a valve actuating device operatively connected to said valve device and adapted to receive said amplified error signal to adjust valve opening in accordance with said amplified error signal, a cylinder communicating at one end thereof with said inlet conduit and at the other end thereof with said outlet conduit, and having a drain opening provided in a wall of said cylinder, a return conduit connected to said drain opening, a spool slidably inserted in said cylinder to adjust the effective area of said drain opening, a spring disposed in said cylinder for urging said spool in one direction, a spool actuating device operatively connected to said spool and adapted to receive said command signal to apply force on said spool urging it in the same one direction in accordance with said command signal, whereby said spool controls the effective area of said drain opening at a position where a force caused by said pressure difference in another direction, a force of said spring and a force caused by said command signal are balanced.

4. A flow control valve as claimed in claim 1, wherein said valve opening is proportional to the value of said amplified error signal and said pressure difference is proportional to the square of said command signal.

* * * * *